United States Patent [19]

Taggart et al.

[11] Patent Number: 4,517,821

[45] Date of Patent: May 21, 1985

[54] AUTOMATIC TORQUE WRENCH TESTER

[75] Inventors: Kenneth J. Taggart, Columbia, Pa.;
Kevin W. Traub, Pluckemin, N.J.

[73] Assignee: K-D Tools, Inc., Lancaster, Pa.

[21] Appl. No.: 545,459

[22] Filed: Oct. 26, 1983

[51] Int. Cl.³ .............................................. G01L 25/00
[52] U.S. Cl. .................................. 73/1 C; 73/862.08;
364/50 G
[58] Field of Search .............. 73/1 C, 862.08, 862.23;
364/506, 508, 550

[56] References Cited

U.S. PATENT DOCUMENTS

| | | | |
|---|---|---|---|
| 2,705,416 | 4/1955 | Thomas | 73/1 C |
| 2,955,454 | 10/1960 | Husher | 73/1 C |
| 3,187,550 | 6/1965 | Bratton | 73/1 C |
| 3,456,485 | 7/1969 | Larson | 73/1 C |
| 4,142,591 | 3/1979 | Himmelstein | 73/863.23 X |
| 4,150,559 | 4/1979 | Levy | 73/1 C |
| 4,171,647 | 10/1979 | Herrgen | 73/1 C X |
| 4,244,213 | 1/1981 | Marcinkiewicz | 73/863.23 |
| 4,262,528 | 4/1981 | Hölting et al. | 73/863.23 |
| 4,450,727 | 5/1984 | Reinholm et al. | 73/863.23 |

FOREIGN PATENT DOCUMENTS

| | | | |
|---|---|---|---|
| 618663 | 8/1978 | U.S.S.R. | 73/863.23 |
| 721684 | 3/1980 | U.S.S.R. | 73/863.23 |
| 838474 | 6/1981 | U.S.S.R. | 73/1 C |

Primary Examiner—S. Clement Swisher
Assistant Examiner—Tom Noland
Attorney, Agent, or Firm—Paul & Paul

[57] ABSTRACT

An automatic torque wrench testing machine uses a strain-gauge transducer to develop signals corresponding to the torque applied to the wrench. The machine is driven by pneumatic/hydraulic drive under the control of a microprocessor. Torque is initially applied at a relatively high rate but as the value of the torque sensed approaches that of a target value, the applied torque is automatically reduced to relatively low rate. When the target or click value is reached, the signal produced by the transducer drops sharply from its highest value. Thereafter, a predetermined number of additional torque values are sensed and compared with the highest value. If none of the succeeding values exceed the highest value, the highest value is displayed, and the direction in which torque is applied to the wrench is reversed until a neutral position is reached. The torque drive is then stopped. The wrench is then tested in the opposite direction.

18 Claims, 9 Drawing Figures

AUTOMATIC TORQUE WRENCH TESTER

BACKGROUND OF THE INVENTION

This invention relates to torque wrenches and in particular to a machine for automatically calibrating and testing torque wrenches.

A principal purpose of the invention is to provide apparatus for automatically calibrating and testing torque wrenches in a minimum amount of time, without physical manual effort, and to an accuracy of the order of 0.2 percent.

It is a further object of the invention that the automatic machine be capable of two-directional calibration and testing without removing the wrench from the machine.

It is yet another object that the machine be capable of calibrating and testing a wrench whose setting has been changed without removing the wrench from the machine.

SUMMARY OF THE INVENTION

The objects of the present invention are achieved, in accordance with the present invention, by the provision of a mechanical calibration and test apparatus which is driven by pneumatic-hydraulic drive means under the control of a microprocessor. The microprocessor controls the operation of a pneumatic/hydraulic system which determines whether the torque applied to the wrench is at a relatively high rate or at a relatively low rate. The torque is applied at the high rate until the torque, as sensed by a strain-gauge torque transducer, approaches within a preselected percentage of the target torque. At that time, the applied torque is reduced to the low rate. When the target or click value of torque is reached, the voltage produced by the strain-gauge torque transducer drops sharply from its highest value. Thereafter, a predetermined number of additional torque values are sensed and compared with the highest value. If none of the succeeding values of torque exceed the highest value, the highest value is displayed, and the direction in which torque is applied by the drive means is reversed. When the drive piston reaches its neutral or mid-position in the cylinder, the return drive is stopped. The wrench is then tested in the opposite direction.

DETAILED DESCRIPTION OF THE PREFERRED EMBODIMENTS

Figure 1:
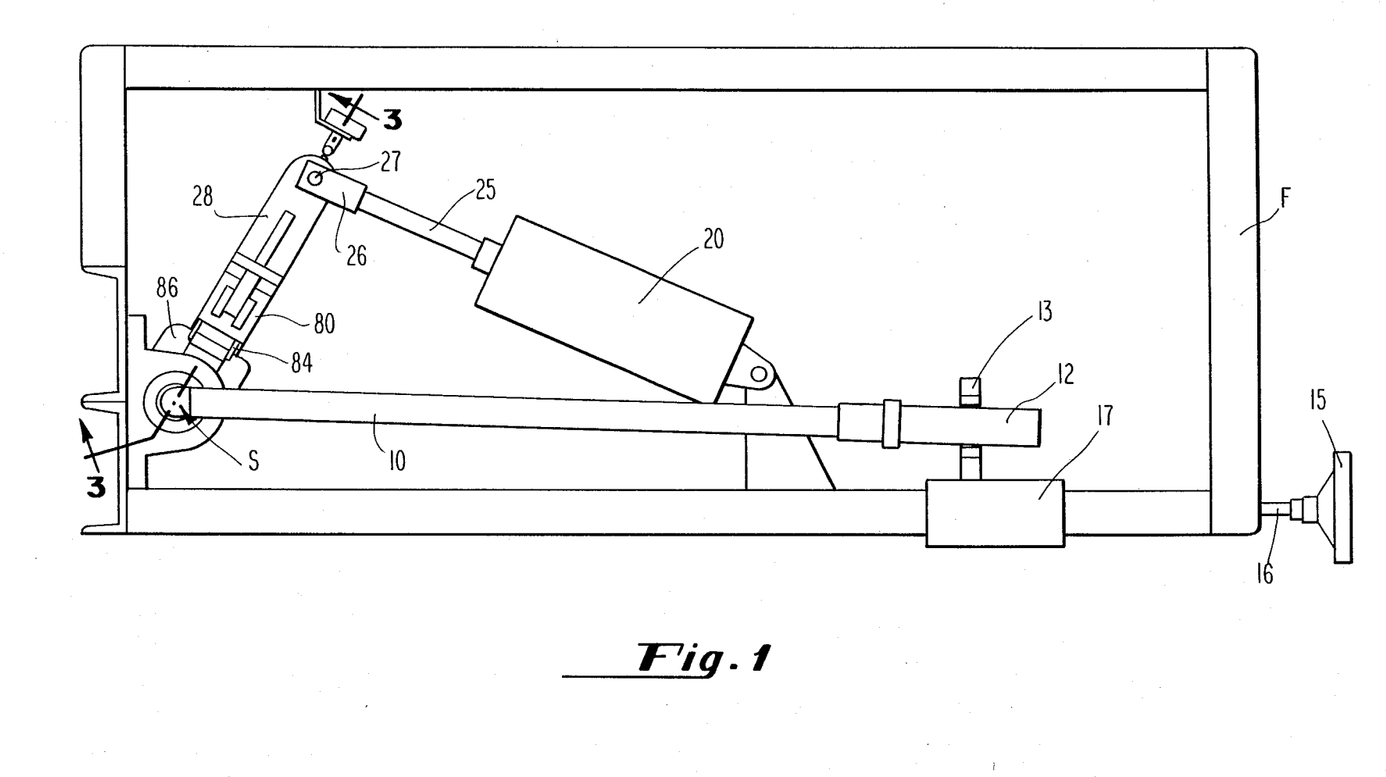
FIG. 1 is a plan view of the automatic torque wrench testing apparatus of the present invention.
Figure 2:
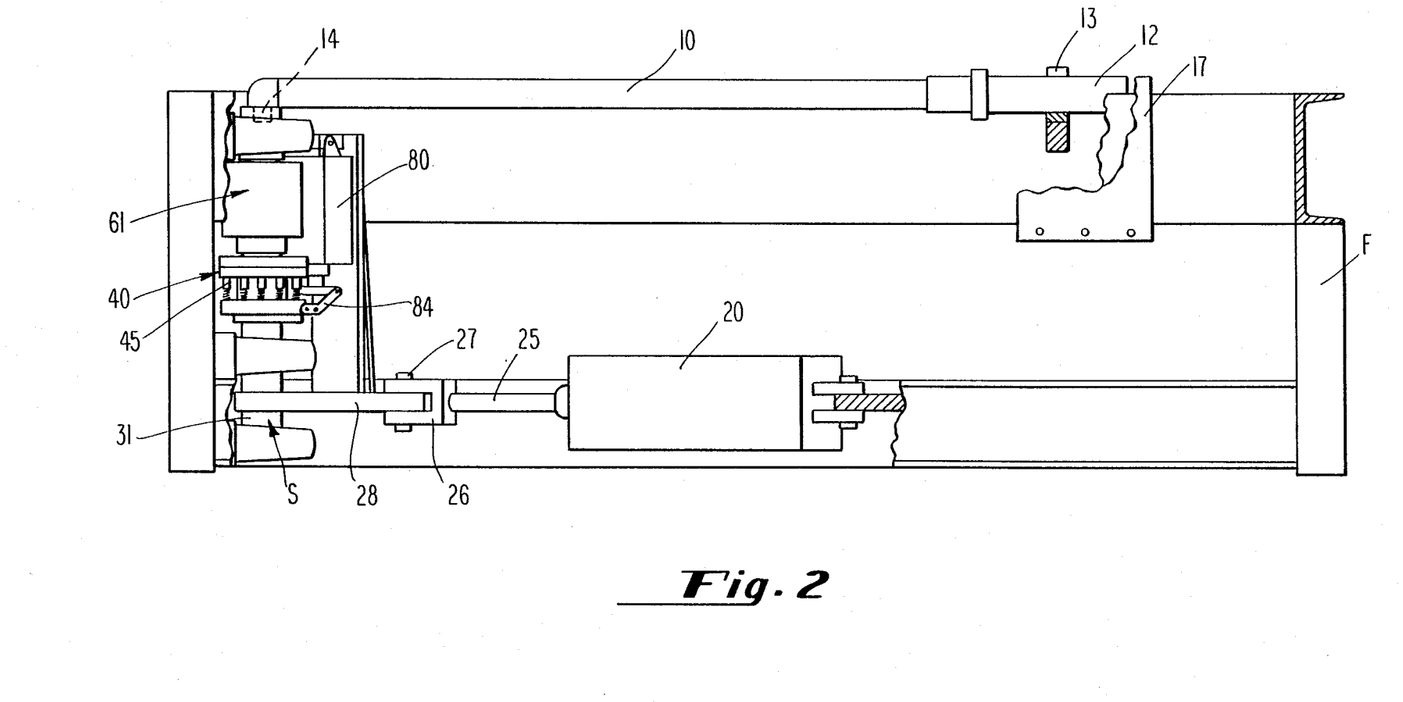
FIG. 2 is a front elevational view of the apparatus of FIG. 1.
Figures 3, 3A:
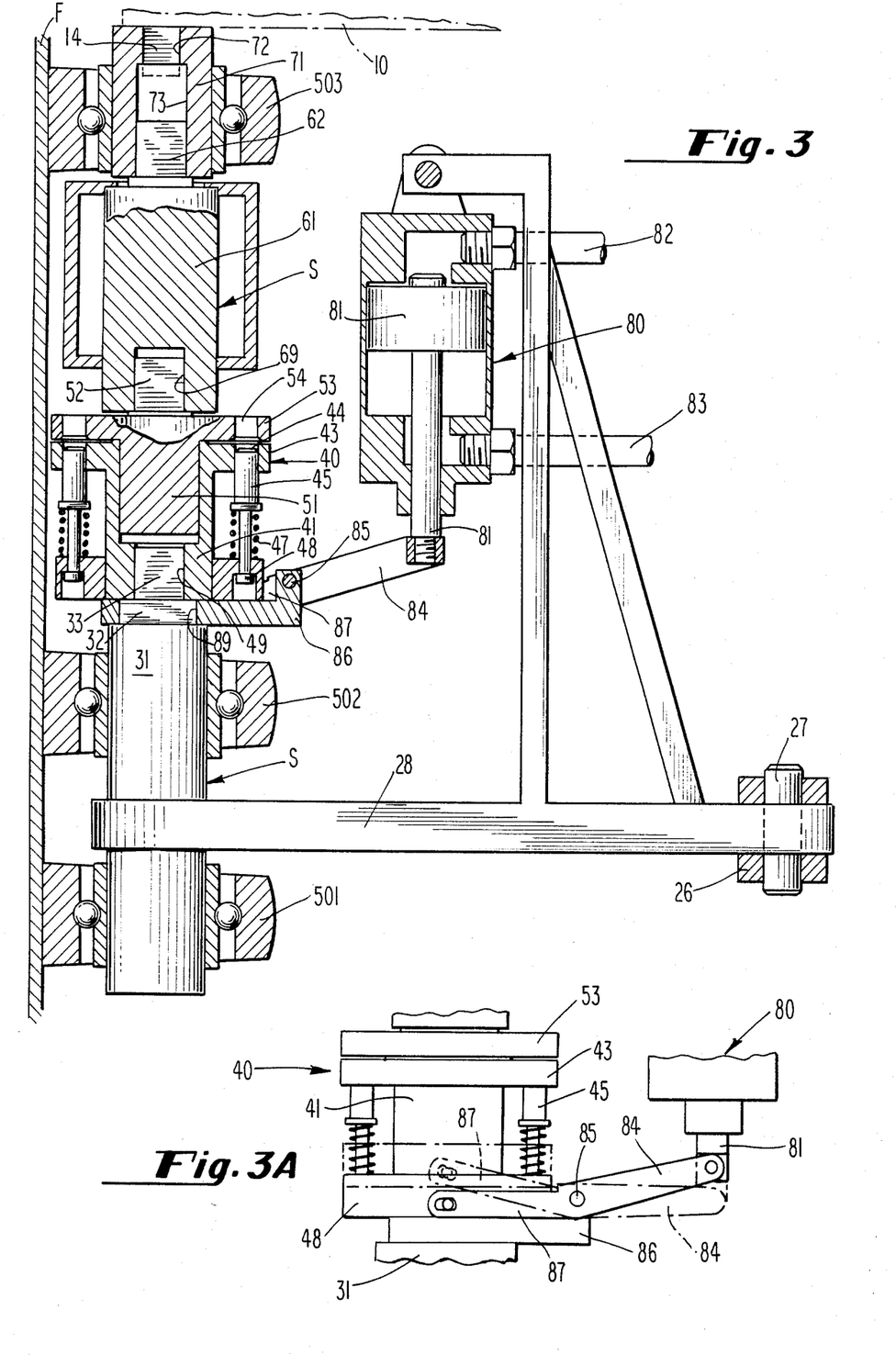
FIG. 3 is an enlarged side elevational view, in section, looking along the line 3—3 of FIG. 1.
FIG. 3A is a detail view of the pin clutch.

Reference will first be made to FIGS. 1, 2 and 3. As there shown, a torque wrench 10 which is to be tested is supported at one end, the left end as viewed in FIGS. 1 and 2, in a torque drive shaft S and at the other end in a U-block 13. Block 13 is secured to a carriage 17 which is movable in the axial direction of its shaft 16 as by means of the knob 15. In FIGS. 1 and 2, the left end of torque wrench 10 is the end which has the projecting square stud 14 (FIGS. 2 and 3). Stud 14 is inserted into a square socket 72 at the upper end of torque drive shaft S. As seen in FIGS. 1 and 2, the right end of the torque wrench 10 has a rotatable micro-adjustment 12. It is this end which is supported in the U-block 13 which, for the purpose of accommodating different lengths of torque wrench, is movable back and forth by means of carriage 17, threaded shaft 16 and knob 15.

The torque drive shaft S is rotatable in one direction or the other by means of a hydraulic cylinder 20 whose piston 25 is pivotally connected as by yoke 26 and coupling pin 27 to one end of a torque lever arm 28. The other end of arm 28 is connected to, or integral with, the lowermost section 31 (FIGS. 2 and 3) of torque drive shaft S.

The neutral position for the head of piston 25 is at the mid-point of hydraulic cylinder 20. Thus, the torque drive shaft S may be driven either clockwise or counter-clockwise. This because, in testing a torque wrench, the wrench is tested in both directions, as will be described.

As seen in FIG. 3, the torque drive shaft S is not an integral shaft from top to bottom. It comprises a number of individual sections, as will be described later in detail. The lowermost section 31, which is connected to and driven by torque lever arm 28 is coupled through a pin clutch 40 to an uppermost or socket section 71 which has a square socket 72 which receives the square stud 14 of the torque wrench 10. An index cylinder 80, which is connected by a lever arm 84 to the pin clutch 40, controls whether the clutch 40 is engaged or disengaged.

Mounted on the torque drive shaft above pin clutch 40 is a section 61 of torque-sensing shaft which functions as a strain gauge torque transducer. Signals are derived from this strain-gauge shaft section 61 which indicate the amount of torque being applied to drive shaft S and to the torque wrench 10 being tested.

Figure 4:
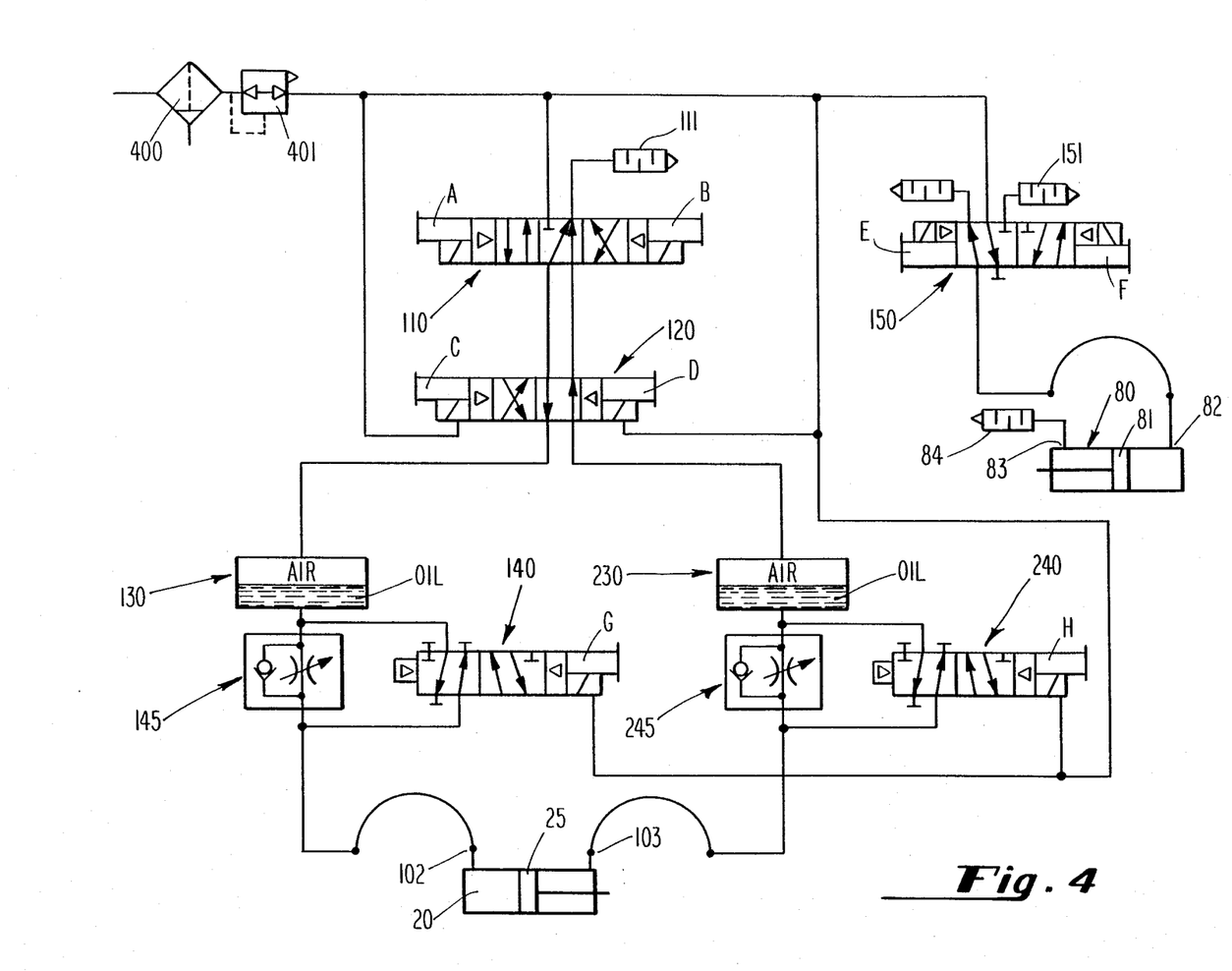
FIG. 4 is a schematic diagram of a hydraulic/pneumatic system for controlling the operation of the machine.

FIG. 4 is a hydraulic/pneumatic schematic diagram which shows how the hydraulic main-piston cylinder 20 and the pneumatic index-piston cylinder 80 are controlled. In FIG. 4, the direction in which piston 25 of main cylinder 20 is driven is controlled by a pair of pneumatic direction valves 110 and 120. The direction in which the piston 81 of index cylinder 80 is driven is controlled by a pneumatic valve 150. The speed at which main piston 25 is driven is controlled by the position of a pair of hydraulic by-pass valves 140 and 240. The pneumatic valves 110, 120 and 150, and the hydraulic valves 140 and 240, shown in FIG. 4, are all solenoid valves controlled by the electrical circuitry shown in FIG. 5 and later to be described in detail.

Figure 5:
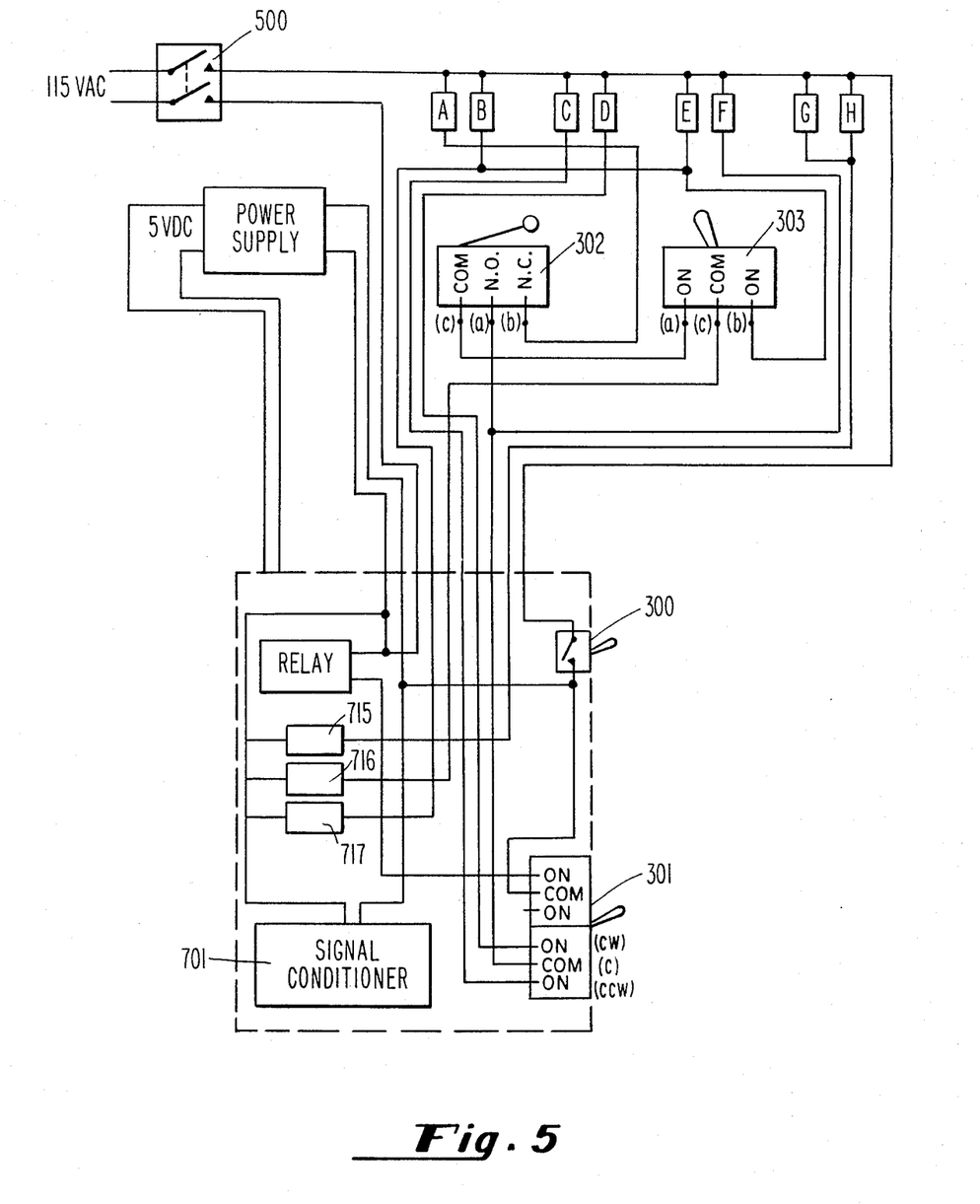
FIG. 5 is a schematic diagram of electrical circuitry for controlling operation of the hydraulic/pneumatic system.

In FIG. 5, when the main switch 500 is closed, solenoids B and E are energized through "forward" relay 717. (See also FIG. 7). Energization of solenoid B causes the pneumatic valve 110 to shift from right to left, as viewed in FIG. 4. Pneumatic pressure is then applied through pneumatic valves 110 and 120 to the upper or air chamber of an air/oil converter 230.

When the main switch 500 is closed solenoids G and H are also energized through "fast" relay 715. (See also FIG. 7). Energization of solenoids G and H causes the hydraulic valves 140 and 240 (FIG. 4) to shift from right to left. Such shifting of the hydraulic valves 140 and 240 provides hydraulic by-passes around the flow-control valves 145 and 245. This establishes the fast or high speed condition for main piston 25. It will be seen that the pressure applied through direction valves 110 and 120 to the upper or air chamber of converter 230 is transferred to the lower or oil chamber of converter 230 and that this oil pressure is applied through the shifted hydraulic by-pass valve 240 to the port 103 of cylinder 20 thereby causing the piston 25 to move relatively rapidly from right to left. This forces hydraulic fluid out of port 102 and up through the shifted by-pass hydraulic valve 140 into the lower or oil chamber of converter 130. This pressure is transferred to the upper or air chamber of converter 130 and air pressure is then applied up through the pneumatic valve 120, through the shifted pneumatic valve 110, and out through muffler 111 to atmosphere.

When solenoid B was energized, solenoid E of pneumatic valve 150 which controls the index cylinder 80 was also energized, thereby causing pneumatic valve 150 to shift from left to right. This applies air pressure to port 82 of the indexing cylinder 80 and, as viewed in FIG. 4, drives piston 81 from right to left, air being forced out through port 83 and muffler 84 to atmosphere. The movement of piston 81 of cylinder 80, which in FIG. 4 is right to left, is a downward movement, as viewed in FIG. 3.

As seen in FIG. 3 and as shown in detail in FIG. 3A, the lower end of piston 81 is connected to a lever 84 which is pivotal about a pin 85 which is supported in an upstanding portion of a bracket 86. Bracket 86 is supported on the shoulder of lowermost section 31 of drive shaft S. Bracket 86 has a square hole 89 which fits over a square portion 32 of section 31 of the drive shaft. The end 87 of lever 84 is connected to an annular member or collar 48 which is movable in the axial direction of shaft S. Thus, as best seen in FIG. 3A, when index piston 81 is driven downwardly, the lever 84 moves pivotally about fixed pin 85 in a clockwise direction and the end 87 of lever 84 forces collar 48 upwardly relative to the tubular body portion of a pin yoke 41. The upper end of pin yoke 41 has an outward annular flange 43 which contains a series of pin holes 44 into which the upper end portions of a series of spring-loaded drive pins 45 project when collar 48 is in its lowermost position.

When, as just described, collar 48 is driven upwardly by the downward movement of the index piston 81, the drive pins 45 are pushed up into the holes 54 contained in the annular flange portion 53 of an intermediate shaft section 51 located between the lowermost shaft section 31 and the upper shaft section 61.

Lowermost shaft section 31 terminates at its upper end in a square stud 33 which is received within a square hole 49 of yoke 41. Intermediate shaft section 51 likewise terminates at its upper end in a square stud 52 which is received within a square recess 69 in the strain gauge shaft section 61. Similarly, shaft section 61 terminates at its upper end in a square stud 62 which is received within a square hole 73 of the socket section 71. As already mentioned, the upper end of shaft section 71 has a square hole or socket 72 which receives the stud 14 of the torque wrench being tested. Shaft section 71 is an interchangeable socket or adapter which is replacable with a socket section having a square hole 72 of a different size to receive a stud 14 of a different size, thereby to accommodate different sizes of torque wrench.

It will be seen from the foregoing that if the index piston 81 has been driven to its DOWN position the drive pins 45 are in their UP position and that yoke 41 is connected to intermediate shaft section 51. Thus, when the main piston 25 is driven in one direction or the other to move the lever 28 in one direction or the other, the entire drive shaft S, comprising the sections 31, 51, 61 and 71, is moved rotationally in that direction, and, accordingly, a torque force is applied to the stud 14 of the torque wrench which is being tested. All mechanisms, including the torque drive shaft S, are supported by ball bearings, such as bearings 501–503 (FIG. 3) on a steel frame F. This permits all generated torque to be transferred to the stationary wrench.

FIG. 5 will now be described in detail. FIG. 5 is a schematic of the electrical circuitry which controls the solenoid valves of the hydraulic/pneumatic system.

In FIG. 5, switch 300 is the ON-OFF switch. Toggle 301 is the directional switch. When toggle 301 is thrown to the UP position, as illustrated in FIG. 5, the common terminal (c) is connected to the clockwise terminal (cw) for testing the wrench in the clockwise direction. When toggle 301 is thrown to the DOWN position, the common terminal (c) is connected to the counter-clockwise terminal (ccw) for testing the wrench in the reverse direction.

Figure 7:
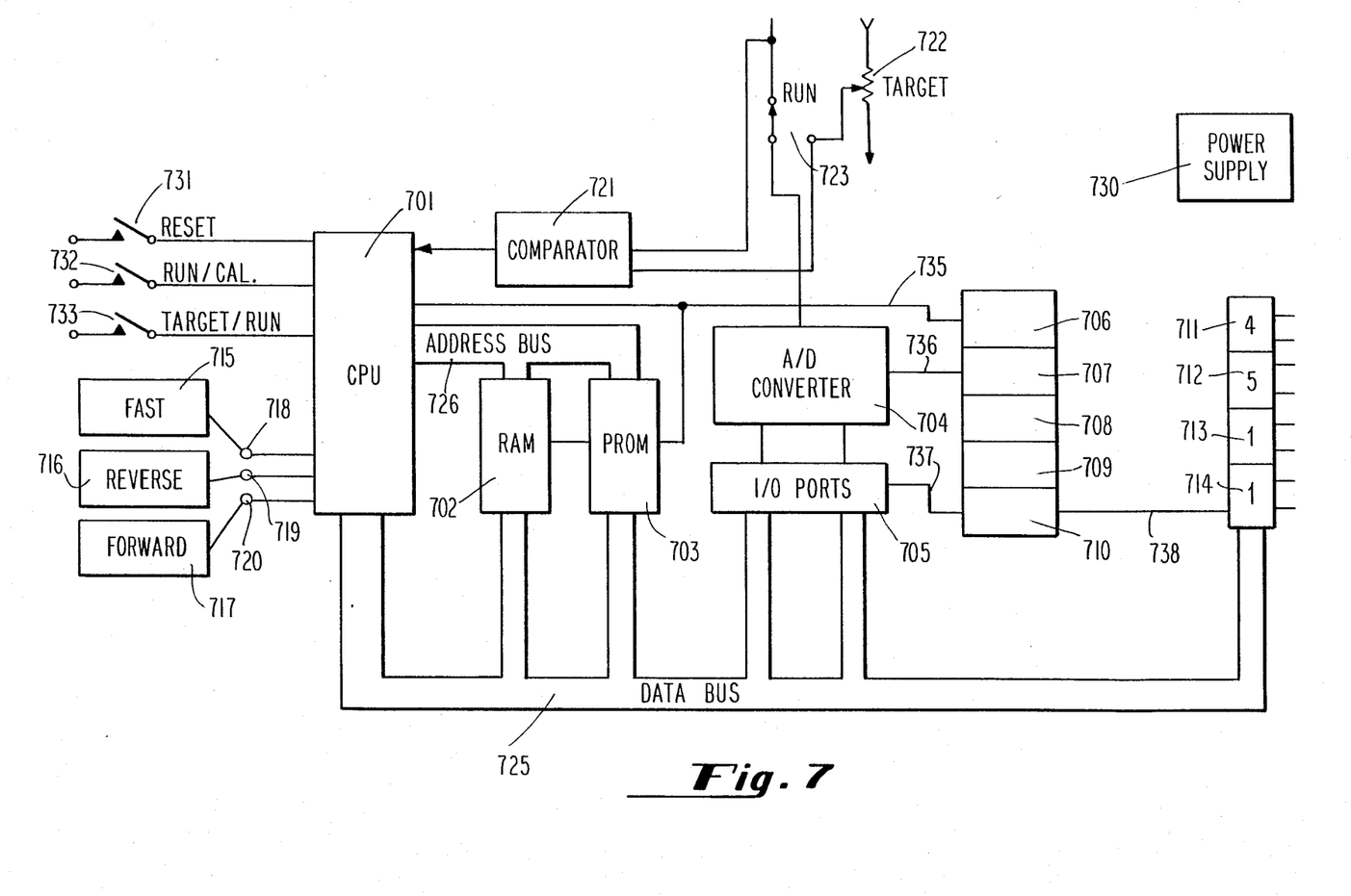
FIG. 7 is a block diagram of the microcomputer section of the automatic torque wrench tester.

Three relays 715, 716, and 717 control the pneumatic/hydraulic system (FIG. 4). These three relays are controlled by the three transistors 718, 719, and 720 (FIG. 7). Relay 715 is the "fast" relay. Relay 716 is the "reverse" relay. Relay 717 is the "forward" relay. When transistor 720 is turned ON, the "forward" relay 717 closes and the "forward" solenoids B and D are energized. When transistor 716 is turned ON, the "reverse" relay 716 closes and the "reverse" solenoids A and C are energized. When transistor 718 is turned ON, the "fast" relay 715 closes and the "fast" solenoids G and H are energized.

In FIG. 5, when the machine is running in the "forward" direction, the common terminal (c) of switch 303 is connected to terminal "b" but the circuit through solenoids B and E is open since "reverse" relay 716 is open. When the machine is running in the "reverse" direction, the common terminal (c) of switch 303 is connected to terminal (a) and a circuit through transistor 716 is completed through terminals (c) and (a) of switch 303, and terminals (a) and (b) of switch 302, thereby energizing solenoid A.

In FIG. 5, switch 302 is a micro-limit switch which is shown in a first of two positions. Switch 302 is placed in the second position only when the main piston 25 is at its neutral position which is at the midpoint of main cylinder 20. When the main piston is not at its neutral position, the common terminal (c) of switch 302 is connected to the normally-closed terminal (b). When the piston is in its neutral position, the common terminal (c) of switch 302 becomes connected to the normally-open terminal (a), and the normally-closed connection to terminal (b) is opened. The connection of the common terminal (c) to terminal (a) of limit switch 302, energizes solenoid F which controls disconnection of the pin clutch 40 by allowing springs 47 (FIG. 3) to return the index piston 81 to its rightmost position as seen in FIG. 4, with air being exhausted through port 82, pneumatic valve 150, and muffler 151.

Solenoids A through H are controlled by three relays 715, 716 and 717. These three relays are controlled by the transistors 718, 719 and 720 (FIG. 7) which are controlled by the CPU I.C. 701 of the microprocessor. Solenoids A,B,C and D control the pneumatic valves 110 and 120 which control the direction in which the piston 25 of the cylinder 20 is driven. Solenoids B and D control the forward direction while A and C control the reverse direction. Solenoids E and F control the position of the pneumatic cylinder 150 which controls the movement of piston 81 in index cylinder 80. This cylinder controls the pin clutch 40. Energizing solenoid E effects engagement of the clutch. Energizing solenoid F effects disengagement of the clutch.

Solenoids G and H are the "fast" solenoids. These solenoids control the hydraulic valves 140 and 240 which determine whether the flow control valves 145 and 245 are, or are not, by-passed. When the flow control valves 145 and 245 are by-passed, the application of hydraulic pressure to main cylinder 20 is accelerated and piston 25 is driven at its "fast" or maximum rate. When the flow control valves 145 and 245 are not by-passed, the flow of hydraulic fluid into main cylinder 20 is substantially lessened and main piston 25 is driven at a relatively slow rate. Whether or not piston 25 is driven at a "fast" rate or at a low rate is controlled by signals obtained from the strain gauge shaft section 61. When solenoids G and H are energized the main piston 25 is driven at the "fast" rate.

Referring again to FIG. 5, switch 300 is a manual ON OFF switch while switch 301 is a manual directional control switch. Switch 302 is a limit micro-switch which is actuated when main piston 25 returns to its mid-position after having been driven by hydraulic fluid pressure toward one end or the other end of main cylinder 20.

In the electrical diagram of FIG. 5, when switch 300 is placed in the ON position and switch 301 is placed in one or the other of its two positions to control the direction of movement of piston 25 in main cylinder 20, control of the automatic machine is taken over by the microprocessor.

Reference is now made to FIG. 7 which is a block diagram of the microprocessor. As there shown, the microprocessor includes a Central Processing Unit (CPU) 701, a 64-byte Random Access Memory (RAM) 702, a Programmable Read Only Memory (PROM) 703, an Analog-To-Digital Convertor (A/D) 704; Input-/Output Ports (I/0 Ports) 705, a number of Integrated Circuits (IC) 706–710, display drivers 711–714, a number of relays 715–717, transistors 718–720 for driving the relays, a comparator 721, a target potentiometer 722, a mode toggle switch 723, a power supply 730, a data bus 725, an address bus, 726, and various control lines 735–738.

The microcomputer shown in block diagram in FIG. 7 is a unique combination of hardware and software which performs a data acquisition function and also functions as an intelligent machine controller.

The automatic torque wrench tester of the present application is capable of exercising a torque wrench, i.e., applying a torque force to a torque wrench, to determine the point at which the wrench signals a "click" which correspond to a preset level of torque.

The automatic test machine accomplishes this by rotating a torque drive shaft which is connected to the stud of a torque wrench. The torque drive shaft contains a load cell or strain gauge which sends to a signal conditioner low level electrical signals which are proportional to the load. In the present case, the load cell or strain gauge is identified in FIG. 3 as a section 61 of the torque drive shaft S.

The signal conditioner 701 amplifies and filters the signals which it receives to provide an input of sufficient voltage to be read and analyzed by an analog-to-digital converter integrated circuit A/D 704 and microcomputer circuitry. The computer performs a real-time analysis on the trend of the increasing level of the signal from the load cell to determine whether or not a temporary peak in the signal has occurred. This temporary peak occurs to a wrench which has "clicked" at its preset torque level. Since this peak is only temporary and the level of the signal will continue to increase after a short period of time due to the continually rising amount of torque being applied to the wrench, the analysis must be performed on a constant and rapid basis to provide accurate information. The type of analysis, and the rapidity of the sampling which is necessary, call for the use of sophisticated machinery to provide a level of accuracy which is achieved by the unique combination of hardware, software and mechanics disclosed in the present application.

The individual functions of the various integrated circuits (IC's) shown in FIG. 7 will now be discussed. The Central Processing Unit 701 is an RCA 1802 CPU I.C. This unit is the heart of the computer and performs a multitude of functions which includes (1) sequentially addressing the system RAM 702 and PROM 703 to retrieve programmed data and instructions, (2) reading data from the A/D 704; (3) sending data to the display drivers 711–714 through the Display Controller I.C.'s, 706–709; (4) executing the instructions and presenting the data read from the memories 702–703 and A/D 704; (5) reading the condition of the function switches through the input flags, and (6) outputing the control signals to the relays 715–717 through the driver transistors 718–720 to control the electro-mechanical solenoids A, B, C, D, E, F, G and H. These solenoids provide the control link to the pneumatic/hydraulic system of the tester.

The CPU 701 addresses the memories 702–703 by way of an 8-bit parallel address bus 726 and transfers data by way of a 8-bit parallel data bus 725. This data is read from the memories 702–703 and A/D 704, is processed, and is sent to the display controller chips 706–710 to indicate to the operator the amount of torque being applied and the amount at which the torque wrench finally "clicked".

The CPU 701 also uses various input and output lines to control the read and write functions on the data bus 725 to control the operation of the solenoids, and to sense the functions desired.

The system RAM 702 is an RCA 64-byte CMOS I.C. with onboard high-order address latch. The system PROM 703 is an industry standard 2716 NMOS 2048-byte memory. The A/D I.C. 704 is a National Semi-Conductor ADC 1210 12-byte CMOS analog-to-digital converter. Two RCA 1852 8-bit I/0 Port I.C.'s 705 are used to buffer the 12 bit A/D data onto the 8 bit data bus. CD 4511 CMOS 7-segment display latch-decoder-drivers 711–714 are used to control the Hewlet-Packard 7-segment light-emitting diode displays.

An assortment of standard 4000 series digital logic I.C.'s 706-710 are used to perform the various gating functions necessary to interface the I.C.'s with each other.

A CA 339 voltage comparator I.C. 721 is used to provide a signal to the CPU showing when the torque value has reached the plus or minus 10 percent "target window" during which the CPU 701 and A/D 704 must constantly sample and analyze the torque trend. A plus 5-volt, plus and minus 12-volt, power supply 730 is used to provide clean DC power to the computer and associated circuitry.

The operation of the computer is as follows: First the target setting must be dialed in by setting the target/run switch 723 and potentiometer 722 in target position and the reset button 731 is depressed. This action routes the output of the target potentiometer 722 to the input of the A/D chip 704 so the computer may display the value to which the target is being set. This is accomplished by constantly sampling the A/D chip 704, converting the data and sending it to the display section 711-714 of computer.

After the target has been set, the target/run switch 723 should be set in the Run position. This will route the output of the strain-gauge shaft section 61 (FIG. 3) to the input of the A/D chip 704 and routes the output of the target potentiometer 722 to the comparator 721 network attached to one of the input flags on the CPU. This comparator network measures the incoming signals on the torque wrench to determine if the torque on the wrench is within minus or plus 10% target value, i.e., whether the torque is in the "target window" shown in FIG. 8.

Upon the depression of the reset button 731, the processor initializes itself and resets the display to the zero condition. The CPU 701 then energizes one of the relays 715-717 which allows the torque drive shaft S (FIGS. 1-3) to start rotating in whatever direction, clockwise or counterclockwise, the switch has been set and then energizes the high speed solenoids G and H which allows maximum rotating speed of the torque drive shaft S. This high rate application of torque continues until the value of the torque applied to the wrench has reached the lower end of the "target window" (FIG. 8) at which time the comparator network signals the CPU.

Figure 8:
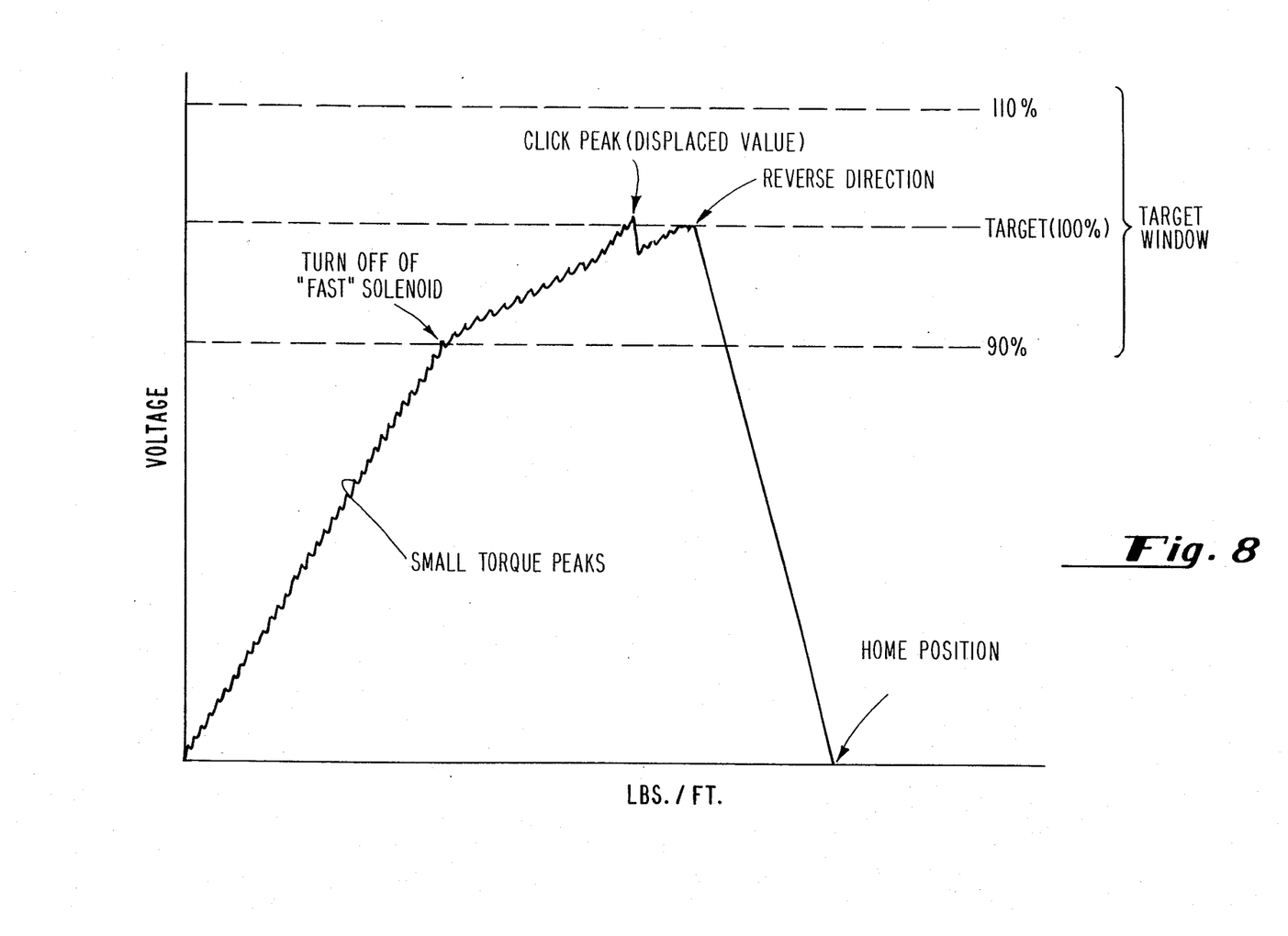
FIG. 8 is a graph illustrating a typical output of the strain gauge/signal conditioner during the testing of a wrench.

When the lower end of the "target window" is reached, and the comparator network has signaled the CPU, the CPU opens transistor switch 718 to turn off the "fast" or high speed relay 715 (FIGS. 5 and 7) and lets the drive shaft S continue to rotate at low speed to provide the most accurate indication of the trip point. This two-speed method, which is illustrated graphically in FIG. 8, is used to increase the throughput of the machine to allow it to be used in a production test environment.

As the drive shaft S continues rotating at slow speed, the torque being applied to the wrench 10 continues building up and the output from the strain gauge shaft section 61 continues to rise. The trend of this rise must be mathematically analyzed to determine if the wrench has reached a temporary peak without exceeding the pre-programmed target setting. This is done by constantly sampling the signal with the A/D 704 and comparing its level to previously stored values. If the trend shows that the level has reached a temporary peak, the "reverse" direction relay 716 is energized by transistor 719 to allow the index to return to the home position and the highest torque value data is sent via the data bus 725 to the display 711-714 and associated controller I.C.'s 706-710. At this point, the machine holds this reading on the display 711-714 until the reset buttom 731 is again depressed to restart the entire operation.

The microprocessor also includes a fail-safe system which prevents over-torquing the wrench. When the signal sensor is enabled, a second comparator is enabled which compares the most recent bit of torque level to target plus 10 percent. If the torque level reaches this point before the signal sensor has found its peak, the microprocessor begins the reverse phase of the sequence, while flashing an "error" indication on the digital display 711-714.

A software filter routine is incorporated into the main program to eliminate false signals due to the inherent friction tendencies exhibited by the index, driving piston, and associated mechanics. Due to this condition, the actual output of the strain gauge shaft section 61 is a continual series of small peaks, as illustrated in FIG. 8. These peaks occur as the index and driving pistons 81 and 25 stick and release themselves during their normal travel to apply torque to the wrench. These small peaks must be distinguished from the peak produced when a wrench gives a valid "click". This routine is part of the constant realtime processing necessary to perform the test.

In addition, a calibration mode is included in the operating program to allow the machine to be periodically adjusted to a calibration standard. This is accomplished by setting the cal/run switch 732 to the "Cal" position and depressing the reset buttom 731. At this point, the output of the strain gauge shaft section 61 will constantly be displayed so that the strain gauge conditioner's internal amplifier's gain and offset may be adjusted to provide the most accurate torque data to the A/D chip 704 and CPU I.C. microprocessor 701.

SUMMARY OF OPERATION

Figure 6:
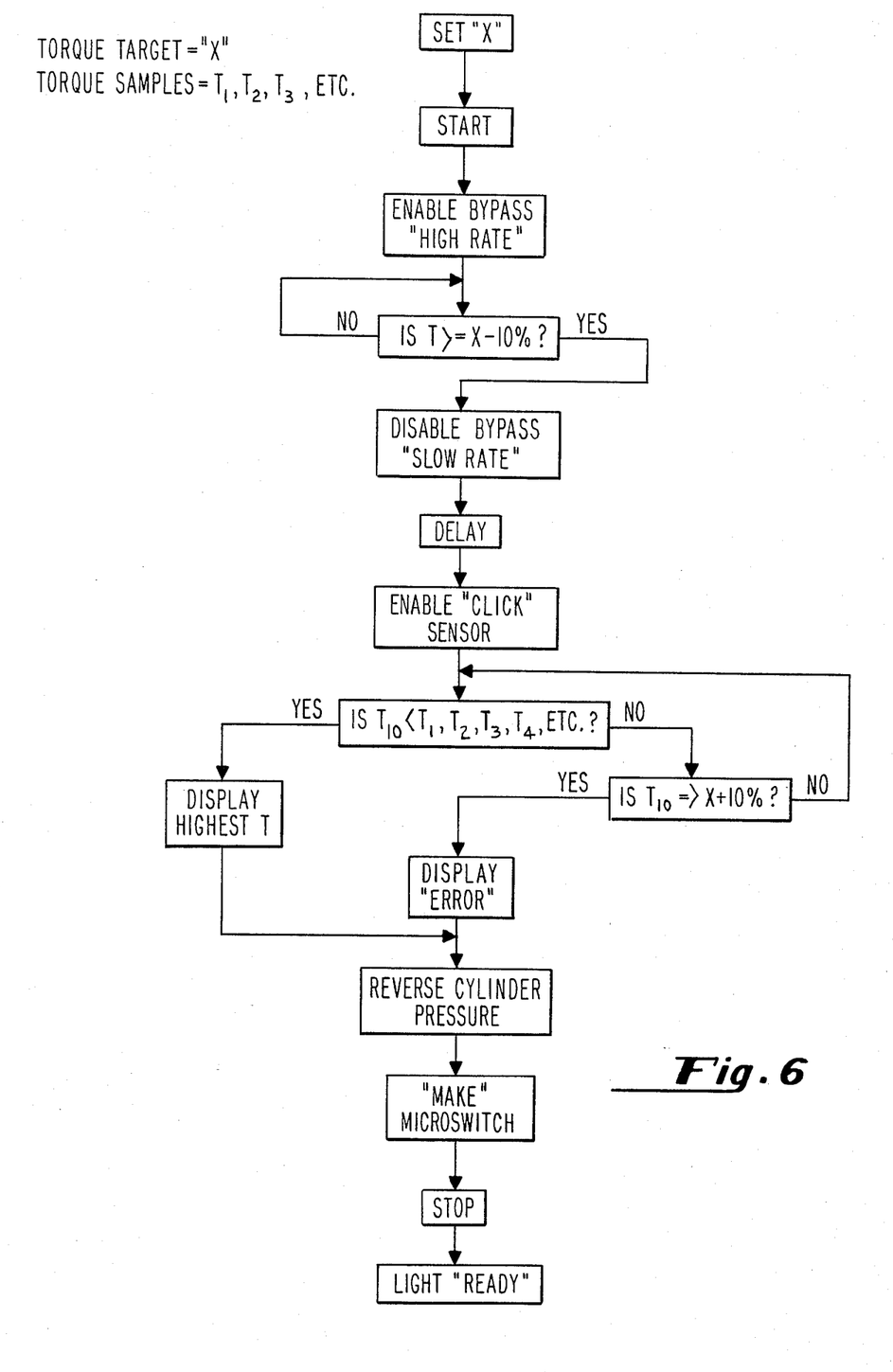
FIG. 6 is a flow chart which will be useful in describing the operation of the automatic torque wrench tester machine.

A summary of the operation of the torque testing machine is given in the flow chart illustrated in FIG. 6. The target potentiometer 722 is adjusted until the display reads the correct target value. The mode toggle 723 is then set to "Run", and the reset button is pressed to initiate the test.

The torque is first applied at a relatively high rate to the drive shaft and hence to the wrench. The magnitude of the torque applied is sensed and signals are generated and fed to the microprocessor. The question asked by the microprocessor is this: Is the torque with value sensed greater than a preselected percentage of the target value. For example, is the torque value sensed greater than the target value minus 10 percent. At first, the answer will be "No". Later, as the torque on the wrench increases, the answer becomes "Yes". When this happens, the torque applied to the wrench is increased at a slower rate. The microprocessor then asks this question: Is the torque sensed less than the torque previously sensed during this run. If the answer is "Yes", the highest previous torque is displayed. Subsequent readings are then taken and if, after a predetermined number of subsequent readings, the torque sensed is always less than the highest torque previously displayed, the test is terminated.

If the answer to the question last asked above is "No", the microprocessor asks this question: Is the torque sensed greater than the target value plus a predetermine percentage. For example, is the torque sensed greater than the target value plus 10 percent. If the answer is "Yes", an "Error" reading is displayed.

Following the test summarized above, a similar test is applied to the wrench but in the opposite rotational direction.

It will be understood that the operation of the electrical system, the operation of the pneumatic/hydraulic system, the constant monitoring of the torque sensed by the strain-gauge torque transducer, the display of the information, etc., are all controlled by the microprocessor (FIG. 7). For example, during the first phase of the test, the opening of the pneumatic "operate" valves 400, 401 (FIG. 4), the shifting of the pneumatic bi-directional valves 110/120, the opening of the hydraulic by-pass valves 140, 240, and the shifting of the pneumatic index cylinder control valve 150, are all under the control of the microprocessor (FIG. 7).

The flow-control valves 145, 245 are preadjusted and locked into a predetermined rate for the entire testing sequence. Simultaneously, the microprocessor "enables", i.e. activates, an internal A/D converter 704 which, along with the CPU 701 and RAM 702, acts as the signal sensor. A signal that the torque applied to wrench 10 has reached its "target" or setting is a sudden decrease in torque due to the physical displacement of internal components in the torque wrench required to generate the sound and/or feel which the manual operator or user senses. This sudden torque drop, which is shown graphically in FIG. 8, occurs at an indefinite time interval before any audible or tactile indication occurs. Thereafter, the voltage begins to climb in incremental steps of small peaks and valleys.

The signal sensor, comprising A/D converter 704 and RAM 702, both being accessed by the CPU I.C. 701 store each torque reading or group of data bits in the RAM 702 in the sequence in which they are received and, using an arithmetic comparison algorithm, the CPU 701 compares the most recent torque reading with a given number of previous readings. If all the previous readings are greater than the current reading, the microprocessor ends this phase of the sequence by scanning the stored information (or readings) and displaying the highest value on the digital display. This terminates the first phase of the testing operation.

The microprocessor begins the next phase by reversing the pneumatic direction valves 110, 120 and opening the hydraulic by-pass valves 140, 240. This reverses the direction in which oil pressure is applied to the main cylinder 20 and causes its piston 25 to retract, thereby moving lever 28 in the opposite direction from that in which it had been moving. This relieves the torque load on stud 14 of the wrench and returns the mechanism toward the neutral position. When the head of piston 25 reaches the mid-point of main cylinder 20, limit microswitch 302 (FIG. 5) is closed and a signal is generated. When the microprocessor receives the signal from micro-switch 302, solenoid F is energized. This shifts pneumatic valve F and allows the force of the compressed springs 47 (FIG. 3) to return collar 48 to its down position and to return piston 81 of the index cylinder 80 to its upper position, as viewed in FIG. 3, thereby withdrawing the clutch pins 45 and thereby decoupling the clutch 40. At the same time pneumatic valves 110, 120 and 150 are closed and all air pressure is exhausted to atmosphere. Simultaneously, a "Ready" light is displayed. The machine is now ready to test the wrench in the opposite or clockwise direction, as viewed in FIG. 1.

It will be seen that the bi-directional ability of the machine is due to the fact that the neutral position of the main drive piston 25 is at the center of the stroke capability of the main hydraulic cylinder 20. This permits loading the drive shaft S in either the clockwise or counterclockwise direction from a common starting position.

The torque wrench testing machine which has been described thus far is a preferred form of machine. In the preferred form of machine, the load cylinder or drive cylinder is arranged to apply torque to a strain-gauge transducer in the form of a torque-sensing shaft and the wrench is held stationary.

In an alternate form of machine, the load cylinder or drive cylinder is arranged to apply torque to the handle of the wrench and the base of the torque-sensing shaft is fixed rigidly to the frame of the machine.

The description of the alternate form of machine given above may be clarified by referring to FIGS. 2 and 3 of the present application. In FIG. 3, the torque-sensing shaft 61, the bearing 503 and the adapter 71 would all be raised vertically from the position shown in FIG. 3, and the base of the torque-sensing shaft 61 would be mounted rigidly onto the frame of the machine. In FIG. 2, the load cylinder or drive cylinder 20 would be rotated ninety degrees from its orientation shown in FIG. 2, and would be vertically raised to the same horizontal level as the torque wrench 10 so that the center line of the drive cylinder 20 would coincide with the center line of the wrench 10. One end of the drive cylinder 20 would be attached to the top of the frame, as viewed in FIG. 1, and at the other end the cylinder piston would be attached to the handle 12 of the wrench. Thus, the wrench would be adapted to be moved by the drive cylinder 20 in a horizontal plane in either the clockwise or counterclockwise directions, and the resulting torque applied to the stud 14 would be sensed by the fixed torque-sensing shaft 61. The electronic sensing system and the pneumatic/hydraulic drive system would be similar to that used in the preferred form of machine described hereinbefore.

What is claimed is:

1. An automatic torque wrench testing machine having means for holding a torque wrench stationary relative to the frame of the machine, a torque drive shaft, and socket means interconnecting the wrench stud and the drive shaft, said machine including:
   a. means for applying torque to said drive shaft;
   b. means for selecting the rotational direction in which torque is applied to said drive shaft;
   c. sensing means for generating electrical signals corresponding to the torque applied to said drive shaft;
   d. a microprocessor;
   e. means for setting a torque target value in said microprocessor;
   f. means, including a comparator in said microprocessor, for comparing said generated signals with said preselected target signal;
   g. means, including said microprocessor, for sensing that the signals developed by said sensing means are within a predetermined range of said target value and means in response thereto for reducing the torque applied to said drive shaft;
   h. means, including said microprocessor, for identifying the peak value of the signal generated by said sensing means at which said torque wrench "clicks", said "click" value being identified by an immediate sharp drop in the signal generated by said sensing means;
i. means, following identification of the "click" value, for sensing a predetermined number of succeeding signals;
j. means for comparing the peaks of said succeeding signals with peaks of prior signals;
k. means for displaying the highest signal peak;
l. means for terminating the application of torque to said drive shaft in said selected direction; and
m. means for returning said drive shaft in the opposite direction to a neutral position.

2. Apparatus according to claim 1 wherein, said sensing means is a strain-gauge transducer.

3. Apparatus according to claim 2 wherein said means for applying torque to said drive shaft includes:
a. a main hydraulic cylinder and piston;
b. means, including a pneumatic/hydraulic system for applying hydraulic fluid at a first relatively high rate to said main cylinder to drive said piston at a first relatively high rate in said selected direction.

4. Apparatus according to claim 3 wherein said piston of said main drive cylinder has a neutral position located at the center of said cylinder, and wherein control means are provided for controlling the direction in which said piston is driven from said neutral position, said control means comprising a pneumatic/hydraulic system which includes:
a. first and second air-to-oil converters each having an air section and an oil section;
b. means, including a first hydraulic flow control valve and a first hydraulic by-pass valve in parallel therewith, for connecting the oil section of said first converter to one end of said main cylinder;
c. means, including a second hydraulic flow control valve and a second hydraulic by-pass valve in parallel therewith, for connecting the oil section of said second converter to the other end of said main drive cylinder;
d. a source of pneumatic pressure;
e. at least one solenoid-controlled pneumatic bi-directional valve for controlling the connection of said source of pneumatic pressure to the air section of one or the other of said first and second converters; and
f. electrical means for controlling the position of said pneumatic bi-directional valve, thereby controlling whether oil pressure is applied from the oil section of the first or the second converter to the one end or to the other end of said main drive cylinder.

5. Apparatus according to claim 4 wherein said first and second hydraulic by-pass valves allow hydraulic fluid to flow at a relatively high rate around said first and second flow control valves respectively thereby driving said main cylinder piston at said first relatively high rate, and wherein, when said first and second by-pass valves are shut off, oil flows through said first and second flow control valves at a relatively low rate, thereby driving said main cylinder piston at a second relatively low rate.

6. Apparatus according to claim 5 wherein following identification and display of the highest signal peak developed by said strain-gauge torque transducer as evidenced by comparison of said predetermined number of succeeding signal peaks with prior signal peaks, said microprocessor develops a signal to reverse the position of said pneumatic bidirectional valve, thereby applying hydraulic pressure to the other end of said main drive cylinder, thereby reversing the direction of movement of said main drive piston.

7. Apparatus according to claim 6 wherein a limit switch is provided to detect the return of said main drive piston to its neutral position in said main drive cylinder, and wherein said microprocessor is adapted to respond to said detection to stop the drive of said machine.

8. Apparatus according to claim 7 wherein said means for sensing that the signals developed by said strain-gauge transducer are within a predetermined range of said target value comprise means for sensing that the signals are within target value minus ten percent.

9. Apparatus according to claim 7 wherein said means for sensing that the signals developed by said strain-gauge transducer are within a predetermined range of target value include fail-safe means for sensing that the signals have not exceeded target value by a predetermined percentage.

10. Apparatus according to claim 1 wherein said sensing means is a strain-gauge transducer adapted for connection to the stud of said shaft.

11. Apparatus according to claim 10 wherein said means for applying torque to said wrench includes:
a. a main hydraulic cylinder and piston; and
b. means, including a pneumatic/hydraulic system for applying hydraulic fluid at a first relatively high rate to said main cylinder to drive said piston at a first relatively high rate in-said selected direction.

12. Apparatus according to claim 11 wherein said piston of said main drive cylinder has a neutral position located at the center of said cylinder, and wherein control means are provided for controlling the direction in which said piston is driven from said neutral position, said control means comprising a pneumatic/hydraulic system which includes:
a. first and second air-to-oil converters each having an air section and an oil section;
b. means, including a first hydraulic flow control valve and a first hydraulic by-pass valve in parallel therewith, for connecting the oil section of said first converter to one end of said main cylinder;
c. means, including a second hydraulic flow control valve and a second hydraulic by-pass valve in parallel therewith, for connecting the oil section of said second converter to the other end of said main drive cylinder;
d. a source of pneumatic pressure;
e. at least one solenoid-controlled pneumatic bi-directional valve or controlling the connection of said source of pneumatic pressure to the air section of one or the other of said first and second converters; and
f. electrical means for controlling the position of said pneumatic bi-directional valve, thereby controlling whether oil pressure is applied from the oil section of the first or the second converter to the one end or to the other end of said main drive cylinder.

13. Apparatus according to claim 12 wherein said first and second hydraulic by-pass valves allow hydraulic fluid to flow at a relatively high rate around said first and second flow control valves respectively thereby driving said main cylinder piston at said first relatively high rate, and wherein, when said first and second by-pass valves are shut off, oil flows through said first and second flow control valves at a relatively low rate, thereby driving said main cylinder piston at a second relatively low rate.

14. Apparatus according to claim 13 wherein following identification and display of the highest signal peak developed by said strain-gauge torque transducer as evidenced by comparison of said predetermined number of succeeding signal peaks with prior signal peaks, said microprocessor develops a signal to reverse the position of said pneumatic bidirectional valve, thereby applying hydraulic pressure to the other end of said main drive cylinder, thereby reversing the direction of movement of said main drive piston.

15. Apparatus according to claim 14 wherein a limit switch is provided to detect the return of said main drive piston to its neutral position in said main drive cylinder, and wherein said microprocessor is adapted to respond to said detection to stop the drive of said machine.

16. Apparatus according to claim 15 wherein said means for sensing that the signals developed by said strain-gauge transducer are within a predetermined range of said target value comprise means for sensing that the signals are within target value minus ten percent.

17. Apparatus according to claim 15 wherein said means for sensing that the signals developed by said strain-gauge transducer are within a predetermined range of target value include fail-safe means for sensing that the signals have not exceeded target value by a predetermined percentage.

18. An automatic testing machine for applying torque to a torque wrench and for sensing and displaying the highest value of torque at which the wrench "clicks", said machine comprising:

a. means for applying torque to said wrench in either rotational direction;
b. sensing means for generating electrical signals corresponding to the torque applied to said wrench;
c. a microprocessor;
d. means for setting a torque target value in said microprocessor corresponding to that of said wrench;
e. means, including a comparator in said microprocessor, for comparing said generated signals with said preselected target signal;
f. means, including said microprocessor, for sensing that the signals developed by said sensing means are within a predetermined range of said target value and means in response thereto for reducing the torque applied to said wrench;
g. means, including said microprocessor, for identifying the peak value of the signal generated by said sensing means at which said torque wrench "clicks", said "click" value being identified by an immediate sharp drop in the signal generated by said sensing means;
h. means, following identification of the "click" value, for sensing a predetermined number of succeeding signals;
i. means for comparing the peaks of said succeeding signals with peaks of prior signals;
j. means for displaying the highest signal peak;
k. means for terminating the application of torque to said wrench in said selected direction; and
l. means for reversing the direction of application of torque for returning said wrench to a neutral position.

* * * * *

UNITED STATES PATENT OFFICE
CERTIFICATE OF CORRECTION

Patent No. 4,517,821          Dated May 21, 1985

Inventor(s) Kenneth J. Taggart and Kevin W. Traub

It is certified that error appears in the above-identified patent and that said Letters Patent are hereby corrected as shown below:

In the Abstract, line 5: "drive" should be --drive means--.

Column 12, line 50: "valve or controlling" should be --valve for controlling--.

Signed and Sealed this

First Day of April 1986

[SEAL]

Attest:

DONALD J. QUIGG

Attesting Officer     Commissioner of Patents and Trademarks